United States Patent [19]

Mohrman et al.

[11] Patent Number: 5,271,636
[45] Date of Patent: Dec. 21, 1993

[54] WHEELCHAIR TRAVEL RESTRICTING DEVICE AND METHOD

[75] Inventors: Daniel P. Mohrman, St. Louis; Jerry W. Dell, Imperial, both of Mo.

[73] Assignee: The Jewish Hospital of St. Louis, St. Louis, Mo.

[21] Appl. No.: 790,759

[22] Filed: Nov. 12, 1991

[51] Int. Cl.⁵ .............................. B60R 25/00
[52] U.S. Cl. .................. 280/304.1; 70/226; 70/227
[58] Field of Search .............. 280/250.1, 304.1; 70/209, 232, 225, 226, 227, 228; 188/32, 2 R

[56] References Cited

U.S. PATENT DOCUMENTS

| | | | |
|---|---|---|---|
| 1,432,657 | 10/1922 | Bednar | 70/226 |
| 1,443,009 | 1/1923 | Davis | 70/226 |
| 1,488,893 | 4/1924 | Plouffe | 70/226 |
| 1,504,220 | 8/1924 | Degen | 70/227 |
| 3,338,338 | 8/1967 | Lindeen | 188/32 |
| 3,907,072 | 9/1975 | Shafer | 188/32 |
| 4,641,994 | 2/1987 | Hankison | 188/32 |
| 4,688,843 | 8/1987 | Hall | 280/250.1 |
| 5,134,868 | 8/1992 | Bethards | 70/226 |

FOREIGN PATENT DOCUMENTS

| | | | |
|---|---|---|---|
| 2233616 | 1/1991 | United Kingdom | 70/226 |
| 9014064 | 11/1990 | World Int. Prop. O. | 280/304.1 |

Primary Examiner—Margaret A. Focarino
Assistant Examiner—Anne Boehler
Attorney, Agent, or Firm—Senniger, Powers, Leavitt & Roedel

[57] ABSTRACT

A travel restricting device for use with a wheelchair of the type having a frame, a seat attached to the frame and wheels mounted for rotation on opposite sides of the frame. The device includes arms having longitudinally opposing outer ends, and hooks at the outer ends of the arms for engaging the wheels. The arms can be extended to move the hooks away from each other or retracted to move the hooks toward each other. A spring biasing the arms toward a retracted position secures the hooks in the wheels such that the device is supported by the wheels for movement with the wheels. The device as secured to the wheels engages the frame upon rotation of the wheels in a first direction for restricting travel of the wheelchair in the first direction and engages the surface supporting the wheelchair upon rotation of the wheels in a second direction for restricting travel of the wheelchair in a second direction.

7 Claims, 2 Drawing Sheets

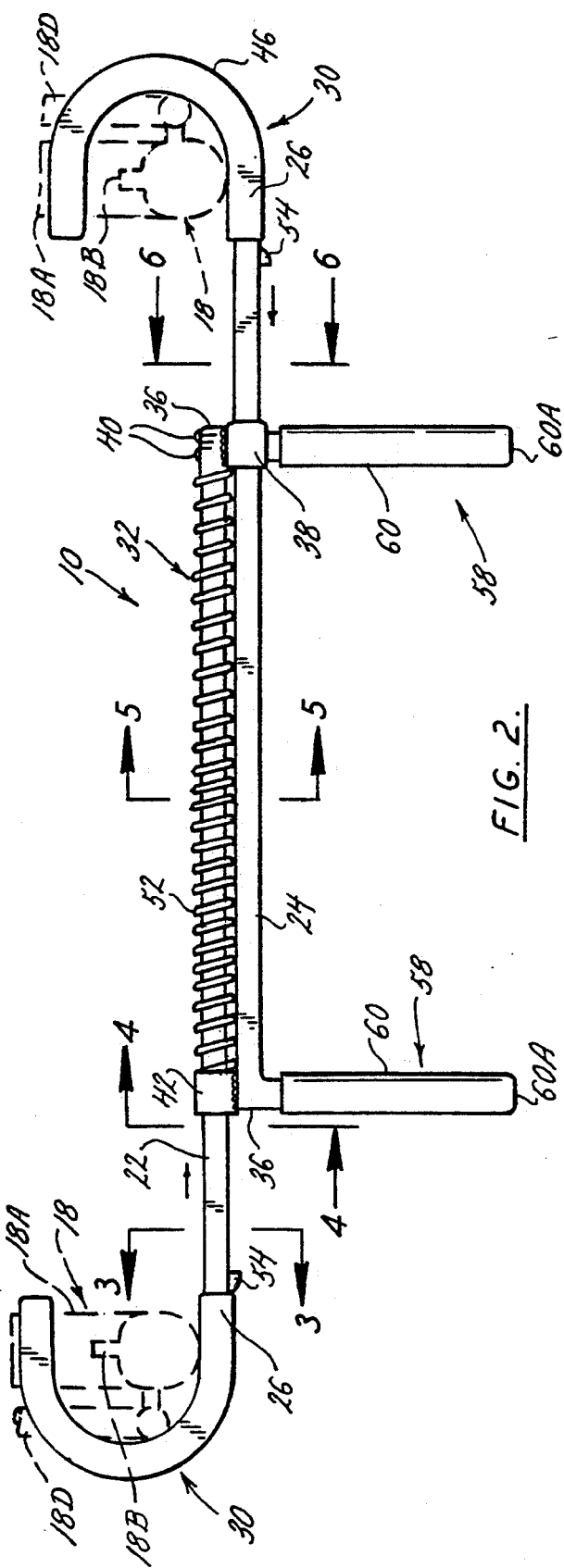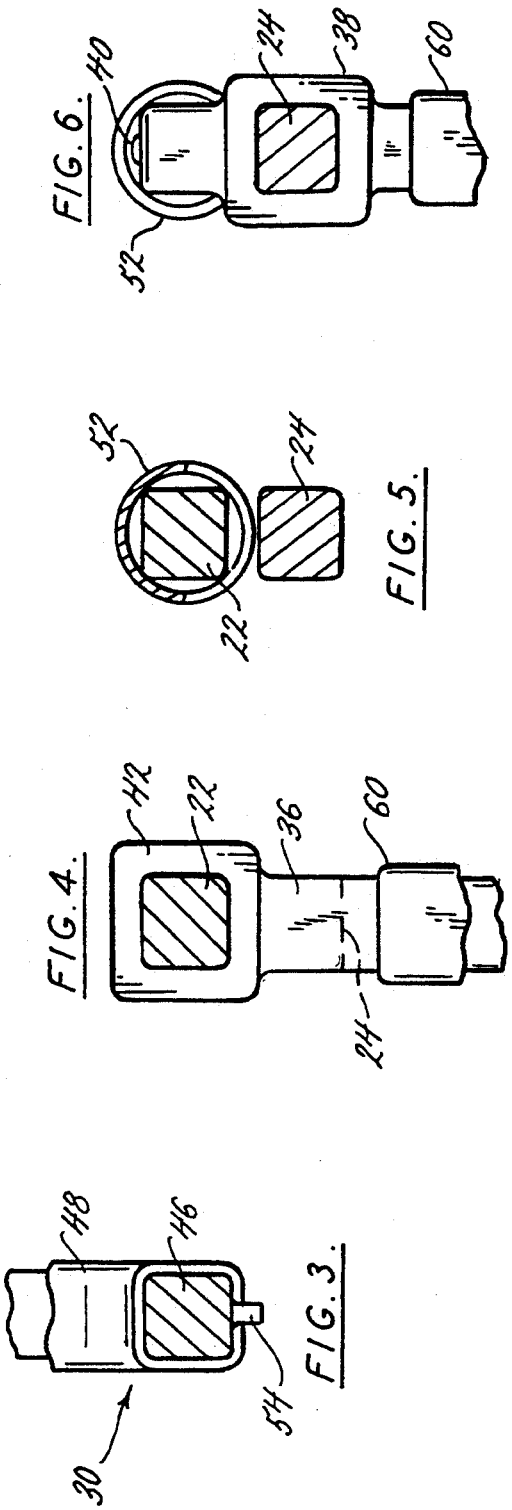

WHEELCHAIR TRAVEL RESTRICTING DEVICE AND METHOD

BACKGROUND OF THE INVENTION

This invention relates to devices and methods for restricting the travel of a wheelchair.

It is widely accepted that persons confined to wheelchairs, and in particular elderly persons with debilitating physical and mental conditions benefit, from the maintenance of social interaction. These persons, who are not otherwise ambulatory, are transported by wheelchair to places (e.g., a recreation room in a hospital or nursing home) where they can meet and interact with other people. However, it is often impossible, especially where large numbers of such patients are present, to provide that person with constant personal attention and supervision. Therefore, there is a risk that a person confined to a wheelchair may become disoriented and confused, causing him or her to wander away from the group without being noticed or to migrate to unattended areas. Because social interaction has significant therapeutic value, there is a need for devices and methods for humanely restricting the area of mobility of such persons in wheelchairs to facilitate the maintenance of such social interaction.

SUMMARY OF THE INVENTION

Among the several objects and features of the present invention may be noted the provision of a travel restricting device for use with a wheelchair which allows the patient to move the wheelchair but restricts the distances which may be travelled; the provision of such a device which is easy to manipulate; the provision of such a device which is securely retained on the wheelchair once applied thereto; the provision of such a device which will not damage floors or the wheelchair; and the provision of such a device which is inexpensive to manufacture.

Further among the several objects and features of the present invention may be noted the provision of a method for restricting the travel of the wheelchair which is simple and yet provides for some freedom of movement.

In one aspect of the invention, a travel restricting device is provided for use with a conventional wheelchair of the type having a frame, means defining a seat attached to the frame and wheels mounted for rotation on opposite sides of the frame to support the frame on a surface. The device includes arm means having longitudinally opposing outer ends, and means at the outer ends of the arms for engaging the wheels. The arm means is adapted for extension to move the outer ends of the arm means away from each other, and retraction to move the outer ends of said arm means toward each other. Means is provided for releasably securing the wheel engaging means to the wheels such that the device is supported by the wheels for movement therewith. The device as secured to the wheels is adapted for engagement with the frame upon rotation of the wheels in a first direction for restricting travel of the wheelchair in the first direction and for engagement with the surface for restricting travel of the wheelchair in a second direction.

In another aspect of the present invention, a travel restricting device as described above is provided in combination with a wheelchair.

A method of the present invention includes the step of providing a travel restricting device as described above. The device is extended to move the outer ends of the arm mean apart to a spacing farther apart than the spacing of the wheelchair wheels. The arm means are then retracted such that the wheel engaging means engage the wheel. Thereafter, the device is supported on the wheels for movement with the wheels to restrict the travel of the wheelchair.

Other objects and features of the present invention will be in part apparent and in part pointed out hereinafter.

BRIEF DESCRIPTION OF THE DRAWINGS

FIG. 2 is a plan view of the device as engaged with the wheels of the wheelchair (fragmentary portions of which are shown in phantom);

FIG. 3 is a section taken in the plane including line 3—3 of FIG. 2;

FIG. 4 is a section taken in the plane including line 4—4 of FIG. 2;

FIG. 5 is a section taken in the plane including line 5—5 of FIG. 2; and

FIG. 6 is a section taken in the plane including line 6—6 of FIG. 2.

Corresponding reference characters indicate corresponding parts throughout the several views of the drawings.

DETAILED DESCRIPTION OF THE PREFERRED EMBODIMENTS

Figure 1:
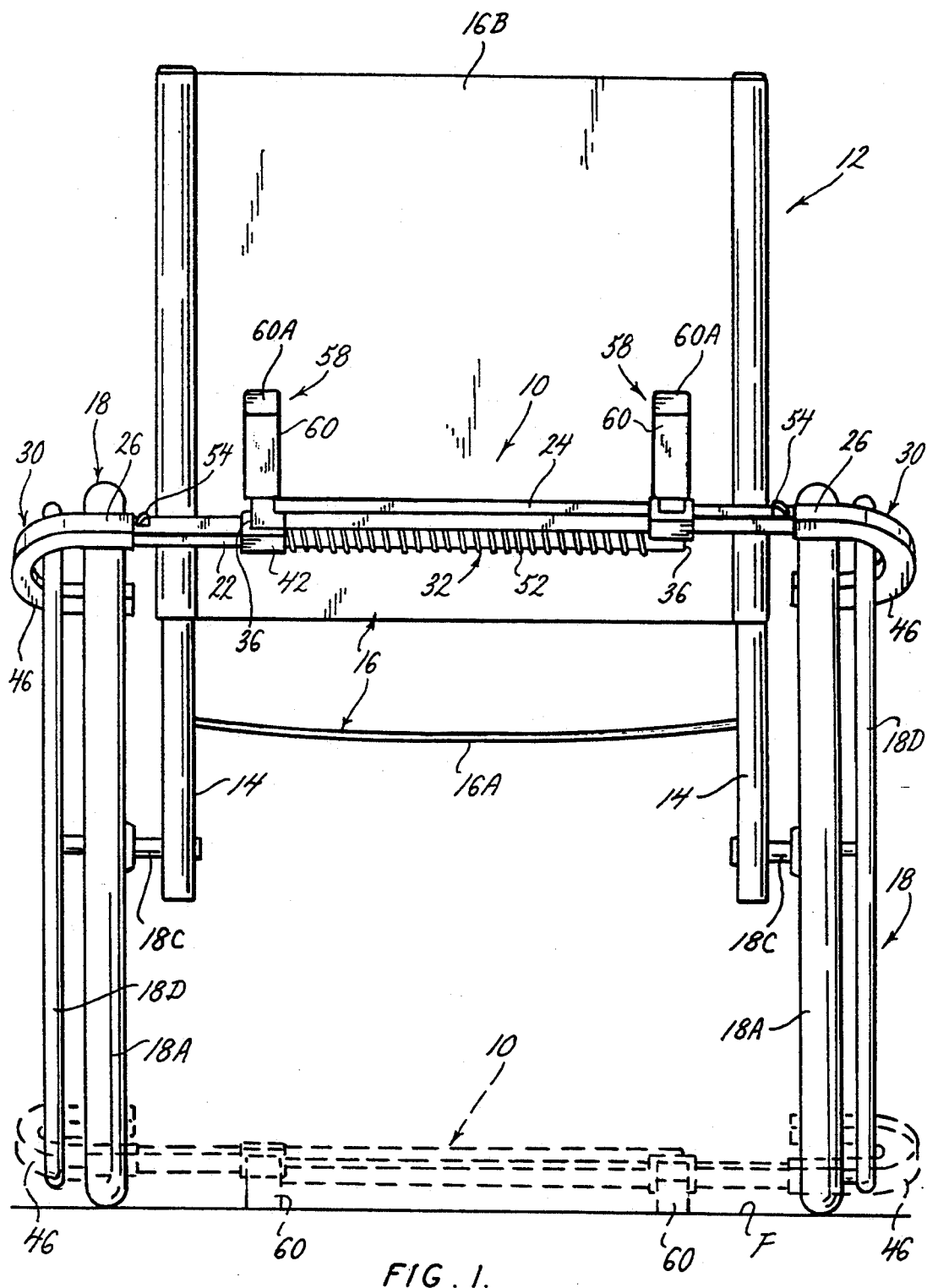
FIG. 1 is a rear elevation of a wheelchair showing a device of the present invention engaged thereon.

A travel restricting device of the present invention, indicated generally at 10, is adapted for use with a wheelchair 12 of the type having a frame 14, means comprising panel members 16 supported between opposing portions of the frame to define a seat including a bottom panel member 16A and a back panel member 16B, and wheels 18. The wheels 18 include radially outer rims 18A connected by spokes 18B to axles 18C mounted on laterally opposite sides of the frame 14 for rotation of the wheels with respect to the frame. Attached to the rim 18A of each wheel 18 and spaced laterally outwardly from the rim is an annular hand grip 18D which facilitates rotating the wheels for moving the wheelchair 12 over a surface (i.e., a floor F) supporting the wheelchair. As shown in FIG. 1, the device 10 includes a first arm 22 and a second arm 24 (broadly "arm means") which are slidable interconnected for movement lengthwise with respect to each other. At the outer ends 26 of each of the arms 22, 24, means 30 is provided for engaging the wheels 18. The arms 22, 24 are adapted for extension to move their outer ends 26 away from each other, and for retraction to move their outer ends toward each other. Securing means 32 for resiliently biasing the arms 22, 24 toward a retracted position in which the outer ends 26 of the arms are closest together secures the wheel engaging means 30 to the wheels 18 so that the device 10 is supported by the wheels for movement with the wheels.

The device 10 moves with the outer rims 18A of the wheels 18, as the wheels are rotated in a first direction tending to move the wheelchair 12 forward, until the device engages the frame 14 adjacent the back panel member 16B of the seat to stop the movement. The device 10 as shown in solid lines in FIG. 1 is in the position of engagement with the frame 14. The device also moves with the rims 18A of the wheels upon rotation of the wheels 18 in a second direction until the device engages the floor F, which stops the rearward movement of the wheelchair 12. The device's position of engagement with the floor is shown in phantom lines in FIG. 1. Thus it may be seen that while freedom of movement is allowed for motion of the wheels 18 between a position in which the device engages the frame 14 adjacent the back panel member 16B and a position in which the device engages the floor, the wheels are restricted from making one or more full rotations so that the wheelchair 12 may not travel distances more than a few feet. The first and second arms 22, 24 are constructed of steel and have inner ends 36 in addition to the outer ends 26 previously defined. As shown in FIG. 2, the arms 22, 24 are arranged such that portions adjacent the inner ends 36 are in side-by-side relationship. The first arm 22 has a first sleeve member 38 attached by a fastener 40 to the first arm at its inner end 36, and the second arm 24 has a second sleeve member 42 welded to the second arm at its inner end. The first arm 22 is slidably received through the second sleeve member 42 (FIG. 4), and the second arm is slidably received through the first sleeve member 38 (FIG. 6). The means 30 for engaging the wheels of the wheelchair 12 comprises hooks 46 (broadly "U-shaped hook members") at the outer ends 26 of the arms, which are integrally formed with the arms 22, 24. As shown in FIG. 2, the hooks 46 curve inwardly such that they extend around the annular hand grips 18D and the wheel rims with the free end of the hooks projecting through the annular openings in the wheels 18 between the spokes 18B, and a portion of each wheel is received in one of the hooks. The engagement of the hooks 46 with the spokes 18B when the device engages the frame 14 or floor F acts to hold the wheels from further rotation. The hooks 46 are covered with a high friction, anti-scratch material 48 (FIG. 3) to facilitate holding the device on the wheels 18 and to protect the hand grips 18D from being scratched by engagement with the hooks.

The securing means 32 comprises a coil compression spring 52 which is received around the first arm 22 such that its axis generally coincides with the longitudinal axis of the first arm (FIG. 5). One end of the spring 52 engages the second sleeve member 42 at the inner end 36 of the second arm 24, and the other end of the spring engages the first sleeve member at the inner end of the first arm 22. The spring 52 may be taken off the device 10 by removing the fastener 40 connecting the first arm 22 to the attached first sleeve member 38, and sliding the spring off the inner end 36 of the first arm. Extension of the arms 22, 24 to separate their outer ends 26 brings the sleeve members 38, 42 closer together such that the spring 52 is compressed, increasing the kinetic energy stored by the spring. Therefore, the arms 22, 24 are biased toward their retracted position in which, as shown in FIG. 2, the biasing force of the spring 52 holds the hooks 46 securely against the wheels 18 on laterally opposite sides of the wheelchair 12. The secure engagement of the hooks on opposing wheels 18 holds the device 10 on the wheels. Raised stops 54 attached to each of the arms 22, 24 at their outer ends 26 adjacent the hooks 46 are engageable with respective sleeve members 38, 42 to limit the retraction of the arms. The stops 54 hold the arms 22, 24 from engaging the covering 48 on the hooks 46 to protect the covering.

Stop means 58 engages the floor F for stopping rotation of the wheels 18 in the second direction and holding the wheels from rolling over the arms 22, 24. The stop means 58 includes two elongate members 60 which projecting outwardly from the first and second arms 22, 24. The outer ends 60A of the elongate members engage the floor F at a point rearward of the wheels 18 upon rotation of the wheels in the second direction. The spacing of the point of engagement of the elongate members 60 with the floor F rearward of the wheels 18 allows the device 10 to act on the wheels with a long lever arm so that it is very difficult for the wheelchair 12 to roll over the arms 22, 24. One of the elongate members 60 is attached to and extends outwardly from the first sleeve member 38, and the other elongate member is attached to and projects outwardly from the second sleeve member 42. This arrangement allows the elongate members 60 to be used as handles for extending the arms 22, 24 to apply the device 10 to the wheelchair 12. The elongate members 60 are covered with a high friction, non-scratch material for secure, non-slip engagement of the elongate members with the floor F and for protecting the floor from being scratched by the elongate members.

The method for restricting travel of the wheelchair 12 of the present invention is embodied in the following description of the application of the device 10 to the wheelchair. The elongate members 60 are grasped, one in each hand, and forced toward each other so that the arms 22, 24 are extended and the hooks 46 at the outer ends 26 of the arms moved apart. The extension continues until the hooks 46 are spaced apart a distance greater than the lateral spacing of the wheels 18. The device 10 is then positioned so that the hooks are in registration with the wheels 18 generally at a position along the rearward portion of the circumferences of the wheels. The force applied to extend the elongate members 60 against the biasing force of the spring 52 is released and the arms 22, 24 are retracted to bring the hooks into engagement with the wheels 18 with the force applied by the spring being sufficient to securely hold the hooks 46 in the wheels. Thereafter, the device 10 moves with rotation of the wheels 18 for engaging the frame 14 or floor F to limit the distance the wheels may be rotated. The device 10 may be removed by again grasping the elongate members 60 and forcing them toward each other to extend the arms 22, 24 until the hooks are clear of the wheels 18.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A temporary travel restricting device for use with a wheelchair to limit the distance the wheelchair may be rolled to prevent a disoriented occupant of the wheelchair from leaving an area in which the occupant may be observed, the wheelchair having a frame, means defining a seat attached to the frame and wheels mounted for rotation on opposite sides of the frame to support the frame on a surface, the device comprising:

first and second arms each having a generally U-shaped outer end adapter to engage a respective wheel of the wheelchair, the first and second arms being slidably interconnected for movement lengthwise with respect to each other between a release position in which the outer ends of the arms are laterally spaced from the wheels and an applied position in which the outer ends of the arms engage respective wheels;

a spring connected at one end to the first arm and at the opposite end to the second arm, the spring biasing the arms toward said applied position, the spring being of sufficient strength to securely hold the device on the wheels by engagement of the outer ends of the first and second arms with the wheels so that the device is supported by the wheels free of any fixed connection to the wheelchair;

the device being adapted to be temporarily attached to the wheelchair by sliding the arms lengthwise relative to one another in a direction against the bias of the spring to the release position in which the outer ends of the arms will clear the wheels, positioning the device generally between the wheels and releasing the arms so that the spring forces the outer ends thereof against the wheels to securely hold the device on the wheelchair;

the device as held on the wheels being adapted for engagement with the frame upon rotation of the wheels in a first direction and for engagement with the surface upon rotation of the wheels in a second direction.

2. A device as set forth in claim 1 further comprising stop means for engaging the surface for holding the wheels from rolling over the device and stopping the rotation of the wheels in the second direction.

3. A device as set forth in claim 2 wherein said stop means comprises two elongate members projecting outwardly from the first and second arms, one of said elongate members being attached to the first arm and the other being attached to the second arm.

4. In combination with a wheelchair having a frame, means defining a seat attached to the frame and wheels mounted for rotation on the frame for supporting the frame on a surface, a device for temporarily restricting travel of the wheelchair to prevent a disoriented occupant of the wheelchair from leaving an area in which the occupant may be observed, comprising:

first and second arms each having a generally U-shaped outer end adapted to engage a respective wheel of the wheelchair, the first and second arms being slidably interconnected for movement lengthwise with respect to each other between a release position in which the outer ends of the arms are spaced from the wheels and an applied position in which the arms engage respective wheels;

a spring connected at one end to the first arm and at the opposite end to the second arm, the spring biasing the arms toward said applied position, the spring being of sufficient strength to securely hold the device on the wheels by engagement of the outer ends of the first and second arms with the wheels so that the device is supported by the wheels free of any fixed connection to the wheelchair;

the device being adapted to be temporarily attached to the wheelchair by manually sliding the arms lengthwise relative to one another in a direction against the bias of the spring to a position in which the outer ends of the arms will clear the wheels, positioning the device generally between the wheels and releasing the arms so that the spring forces the outer ends thereof against the wheels to securely hold the device on the wheelchair;

the device as held on the wheels being adapted for engagement with the frame upon rotation of the wheels in a first direction and for engagement with the surface upon rotation of the wheels in a second direction.

5. The combination as set forth in claim 4 wherein the device further comprises stop means for engaging the surface for holding the wheels from rolling over the device and stopping the rotation of the wheels in the second direction.

6. The combination as set forth in claim 5 wherein said stop means comprises two elongate members projecting outwardly from the first and second arms, one of said elongate members being attached to the first arm and the other being attached to the second arm.

7. A method for temporarily restricting travel of a wheelchair to prevent a disoriented occupant of the wheelchair from leaving an area in which the occupant may be observed, the wheelchair including a frame, means defining a seat attached to the frame and wheels mounted for rotation on laterally opposite sides of the frame, the wheels supporting said frame on a surface, the method comprising the steps of:

providing a travel restriction device including a pair of slidably interconnected arms, each arm having a generally U-shaped outer end, the arms being slidable lengthwise with respect to each other, and a spring connected to the arms for biasing the arms toward a first position;

sliding the arms lengthwise relative to one another against the biasing force of the spring away from the first position to a second position;

holding the arms in the second position;

moving the device from a location remote from the wheelchair to a location generally between the wheelchair wheels with arms extending generally transversely of the wheelchair and the outer ends of the arms clear of the wheels;

securing the device to the wheels such that the device is supported by the wheels by releasing the device to permit the spring to move the arms lengthwise toward the first position with the U-shaped outer ends of the arms engaging the wheels, the device being supported between the wheels for movement with the wheels such that the device is adapted to engage the frame upon rotation of the wheels in a first direction and adapted to engage the surface upon rotation of the wheels in a second direction.

* * * * *